United States Patent [19]
Tomich

[11] Patent Number: 5,778,116
[45] Date of Patent: Jul. 7, 1998

[54] PHOTONIC HOME AREA NETWORK FIBER/POWER INSERTION APPARATUS

[76] Inventor: John L. Tomich, 614 Meadowview La., Coppell, Tex. 75019

[21] Appl. No.: 785,413

[22] Filed: Jan. 23, 1997

[51] Int. Cl.$^6$ .................. G02B 6/26; H04J 14/02
[52] U.S. Cl. .................. 385/16; 385/15; 385/24; 359/109; 359/125; 359/128
[58] Field of Search .................. 385/2, 8, 9, 15, 385/16, 20, 22, 24, 27, 14; 359/109, 110, 115, 117, 118, 124, 125, 128, 137; 348/6, 10

[56] References Cited

U.S. PATENT DOCUMENTS

| | | | |
|---|---|---|---|
| 4,183,054 | 1/1980 | Patisaul et al. | 358/86 |
| 4,392,714 | 7/1983 | Brüggendieck et al. | 385/100 X |
| 4,497,537 | 2/1985 | Deusch | 385/100 X |
| 4,533,247 | 8/1985 | Epworth | 356/345 |
| 4,621,282 | 11/1986 | Ahern | 358/86 |
| 4,627,106 | 12/1986 | Drake | 359/115 X |
| 4,662,004 | 4/1987 | Fredriksen et al. | 359/115 X |
| 4,748,689 | 5/1988 | Mohr | 359/115 X |
| 4,834,485 | 5/1989 | Lee | 385/16 X |
| 4,886,335 | 12/1989 | Yanagawa et al. | 385/16 X |
| 4,964,687 | 10/1990 | Falk | 385/16 X |
| 5,033,112 | 7/1991 | Bowling et al. | 359/115 X |
| 5,043,037 | 8/1991 | Buckland | 156/166 |
| 5,113,403 | 5/1992 | Block et al. | 359/152 |
| 5,117,122 | 5/1992 | Hogarth et al. | 307/140 |
| 5,175,777 | 12/1992 | Bottle | 385/17 |
| 5,218,356 | 6/1993 | Knapp | 342/350 |
| 5,247,381 | 9/1993 | Olmstead et al. | 359/118 |
| 5,268,971 | 12/1993 | Nilsson et al. | 385/101 |
| 5,274,725 | 12/1993 | Bottoms, Jr. et al. | 385/105 |
| 5,317,665 | 5/1994 | Herrebrugh | 385/101 |
| 5,440,655 | 8/1995 | Kaplow et al. | 385/25 |
| 5,442,720 | 8/1995 | Shaw | 385/16 |
| 5,448,660 | 9/1995 | Calvani et al. | 385/21 |
| 5,481,635 | 1/1996 | Arroyo et al. | 385/103 |
| 5,495,546 | 2/1996 | Bottoms, Jr. | 359/115 X |
| 5,553,175 | 9/1996 | Laughlin | 385/16 |
| 5,568,575 | 10/1996 | Sato | 385/16 |
| 5,587,551 | 12/1996 | Kendrick, Jr. | 174/1 |

OTHER PUBLICATIONS

"Reference Guide for the Gigabit Rate Transmit/Receive Chip Set (HDMP-1000) Evaluation Board," Hewlett Packard, Tentative Data Oct. 1992.

"Broadband Polarization Beamsplitter Cubes," Newport Corporation, *Newport*, pp. B-34, 53, and 71. (No Date of Publication).

(List continued on next page.)

*Primary Examiner*—Brian Healy
*Attorney, Agent, or Firm*—Crutsinger & Booth

[57] ABSTRACT

Provided is an apparatus for distributing and controlling distribution of externally and locally generated communications signals to and between a plurality of subscribers. A photonic distribution apparatus for a home area network having a plurality of subscribers has an optical transmission medium for conveying a communications data signal containing a plurality of distribution instruction segments, a microcontroller circuit, and a communications routing circuit. The optical transmission medium has at least one transmit and one receive pathway. The communications routing circuit responsive to a distribution instruction from the microcontroller circuit. The routing circuit has a plurality of fiberoptic switches in fiberoptic communication with one another, wherein a first fiberoptic switch of the plurality of fiberoptic switches has an input terminal photonically connected to said one receive pathway, and a last fiberoptic switch of the plurality of fiberoptic switches has an output terminal photonically connected to said transmit pathway.

8 Claims, 4 Drawing Sheets

OTHER PUBLICATIONS

"Technology 1996," *IEEE Spectrum*, Jan. 1996, vol. 33, No. 1, pp. 2,46–50.

"LOO-38 Ethernet Data Link", Laser Communications, Inc., 1993.

"LOO-59 Token Ring System," Laser Communications, Inc., 1994.

"LOO-36F T1 Link," Laser Communications, Inc., 1994.

"OMNI BEAM 2000 Series", Laser Communications, Inc., 1995.

"Omni Beam 2000 ™ Laser Video Transceiver Series," Laser Communications, Inc., Jan. 1995.

"VOICE TRUNK Laser Applications—Product Overview," Laser Communications, Inc., Jan. 30, 1995.

"LACE ™ A unique line of laser transmission products designed to meet all your communications needs," Laser Communications, Inc., Jun. 1995.

"The 'S' Class of Wireless Solutions!", Laser Communications, Inc., Jul. 1995.

"OmniBeam 4000 34–155 Mbps Wireless Laser Link," Laser Communications, Inc., Sep. 1995.

LCI Master Price List, Laser Communications, Inc., Sep. 20, 1995.

"OmniBeam 2000 ™ Data/Voice Link," Laser Communications, Inc., Oct. 1995.

"TOKEN RING Laser Applications—Product Overview," Laser Communications, Inc., Oct. 9, 1995.

"ETHERNET Laser Applications—Product Overview," Laser Communications, Inc., Oct. 9, 1995.

"Laser Communications, Inc.—Frequently Asked Questions," Nov. 1995.

StrataCom, Inc., "BNI–155:SONET/SDH 155 Mbit/s Broadband Network Interface," web page, Oct., 1996, pp. 1–7.

"Building–to–Building *Wireless Communications*" Laser Communications, Inc., undated.

"OB2000 Application Guide", Laser Communications, Inc., 1995.

"IEEE 1394, FireWire, is economical, easy to install, very fast . . . *and here,"IEEE Spectrum*, Apr., 1997, pp. 19–25.

Dicon Fiberoptics, Inc., "Fiberoptic Switch Catalog," Nov., 1996, pp. 1–8, 13, 14, & 17.

AMP Incorporated, "AMP SC connector Catalog 124003", Jul., 1996, pp. 1.10; published U.S.A.

Vitesse Semiconductor Corp., "SONET/SDH 622 Mb/s 4–bit Mux Demux with Integrated Clock Generation", GPS pub G52136–0 Rev. 1.2, Advanced Product Information, VSC8112. (No Date of Publication).

Vitesse Semiconductor Corp., "ATM/SONET/SDH 155/622 Mb/s Transceiver Mux/Demux with Integrated Clock Generation," GPS pub G52142–0 Rev. 1.2, Preliminary Data Sheet VSC8111. (Undated).

Vitesse Semiconductor Corp., "ATM/SONET/SDH 155/622 Mb/s Transceiver Mux/Demux with Integrated Clock Generation," GPS pub G51011–0, Rev. 1.5, Data Sheet VSC8110. (Undated).

Vitesse Semiconductor Corp., "155.52 Mb/s Clock and Data Recovery Units," GPS pub G52087–0 Rev. 1.3, Preliminary Data Sheet VSC8101/8102. (Undated).

StrataCom, Inc., "Broadband Trunking Solution," 1996.

LSI LOGIC, "ATM Uni Processors and Controllers," web page, Oct., 1996, pp. 1–3.

LSI LOGIC, "SONET/SDH Interface Core," web page, Oct., 1996, pp. 1–3.

PHOTONIC HOME AREA NETWORK FIBER/POWER INSERTION APPARATUS

TECHNICAL FIELD

The present invention relates to an apparatus for routing power and inserting fiber optic cabling for a photonic local area network in a residential or a business neighborhood.

BACKGROUND OF THE INVENTION

Conventionally, electrical power service cabling and communications service cabling—such as cable and telephone communications—have been physically separate because of electrical noise interference on communications and safety concerns with exposure to high power transmission cabling. Conventionally, power and communications cabling were also separate installations because different providers provided the installation.

Fiber-optic cable has been available and has a non-conductive capacity in which electric or magnetic fields do not affect transmission of optical waveforms through the optic cable. Thus the conventional constraint of mixing communications cables with power cables due to electronic or "white noise" concerns was resolved. Examples of power cables incorporating fiber optic cables is illustrated in U.S. Pat. Nos. 5,274,725 and 5,495,546 issued to Bottoms et al., which discloses an embedded fiber optic cables within ground conductors used in high voltage power line architectures.

Conventionally, new neighborhood developments have utility connections such as electrical power, telephone PSTN copper twisted pair, cable television coaxial cable. Each service is trenched by separate installation contractors and owned by individual business entities, adding to the complexity and overall cost. Conventionally, primary power in new developments is distributed to local transformers in a parallel fashion. From the transformers the wiring is installed in a star topology to each individual home or business. Conventionally, communications companies form their own communications distribution overlay. In total, power and communications installation for a development require five trenching installations.

Furthermore, service company monitoring of a customers use was limited and control is maintenance intensive. For example, power service companies would have field technicians read power meters. These readings would then be compiled to provide a customer their billing.

Thus, to reduce costs and complexities in construction and installation, an integrated power and communications distribution unit for selective distribution and data acquisition for providing power and communications services to a set of residential or business buildings is desired. It is also desired that the integrated power and communications unit have a large data rate for accommodating video, audio and high bandwidth data.

From the foregoing discussion, it can be appreciated that a need exists for a simplified neighborhood transmission system that is safe and has a large data rate for accommodating video, audio and high bandwidth data with mixed synchronous, asynchronous, unidirectional and bidirectional transmission formats that is integrated within the community and the power distribution system.

SUMMARY OF THE INVENTION

Provided is an apparatus for distributing and controlling distribution of externally and locally generated communications signals to and between a plurality of subscribers.

A photonic distribution apparatus for a home area network having a plurality of subscribers has an optical transmission medium for conveying a communications data signal containing a plurality of distribution instruction segments, a microcontroller circuit, and a communications routing circuit. The optical transmission medium has at least one transmit and one receive pathway. The communications routing circuit responsive to a distribution instruction from the microcontroller circuit. The routing circuit has a plurality of fiberoptic switches in fiberoptic communication with one another, wherein a first fiberoptic switch of the plurality of fiberoptic switches has an input terminal photonically connected to said one receive pathway, and a last fiberoptic switch of the plurality of fiberoptic switches has an output terminal photonically connected to said transmit pathway.

In another aspect, the photonic distribution apparatus has a second optical transmission medium having at least one transmit and one receive pathway. The second optical transmission medium is for redundantly conveying the communications data signal containing a plurality of distribution instruction segments. A second communications routing circuit is responsive to the distribution instruction from the microcontroller circuit. The second routing circuit has a second plurality of fiberoptic switches in fiberoptic communication with one another, wherein a first fiberoptic switch of the second plurality of fiberoptic switches has an input terminal photonically connected to said one receive pathway, and a last fiberoptic switch of the plurality of fiberoptic switches has an output terminal photonically connected to said transmit pathway.

In a further aspect, the optical transmission mediums are embedded in an electrical cable having a plurality of electrical power conductors.

In yet another aspect, the invention has a high-voltage enclosure, and a low-voltage enclosure, the microcontroller circuit and the communications routing circuit being contained in the low-voltage enclosure. A high-voltage transformer contained within said high-voltage enclosure, said transformer electrically connected to said plurality of electrical power conductors of said electrical cable and said first and second optical transmission mediums photonically.

These and other features and advantages of the present invention will be apparent to those skilled in the art upon reading the following detailed description of preferred embodiments and referring to the drawing.

DESCRIPTION OF THE DRAWING

The accompanying drawings are incorporated into and form a part of the specification to illustrate several examples of the present invention. The drawings together with the description serve to explain the principles of the invention. The drawings are not necessarily to scale and the proportions of certain parts may have been exaggerated to better illustrate details and features of the invention. The drawings are only for the purpose of illustrating preferred and alternative examples of how the invention can be made and used and is not to be construed as limiting the invention to only the illustrated and described examples. The various advantages and features of the present invention will be apparent from a consideration of the drawings in which.

DESCRIPTION OF THE PREFERRED EMBODIMENT

Figure 1:
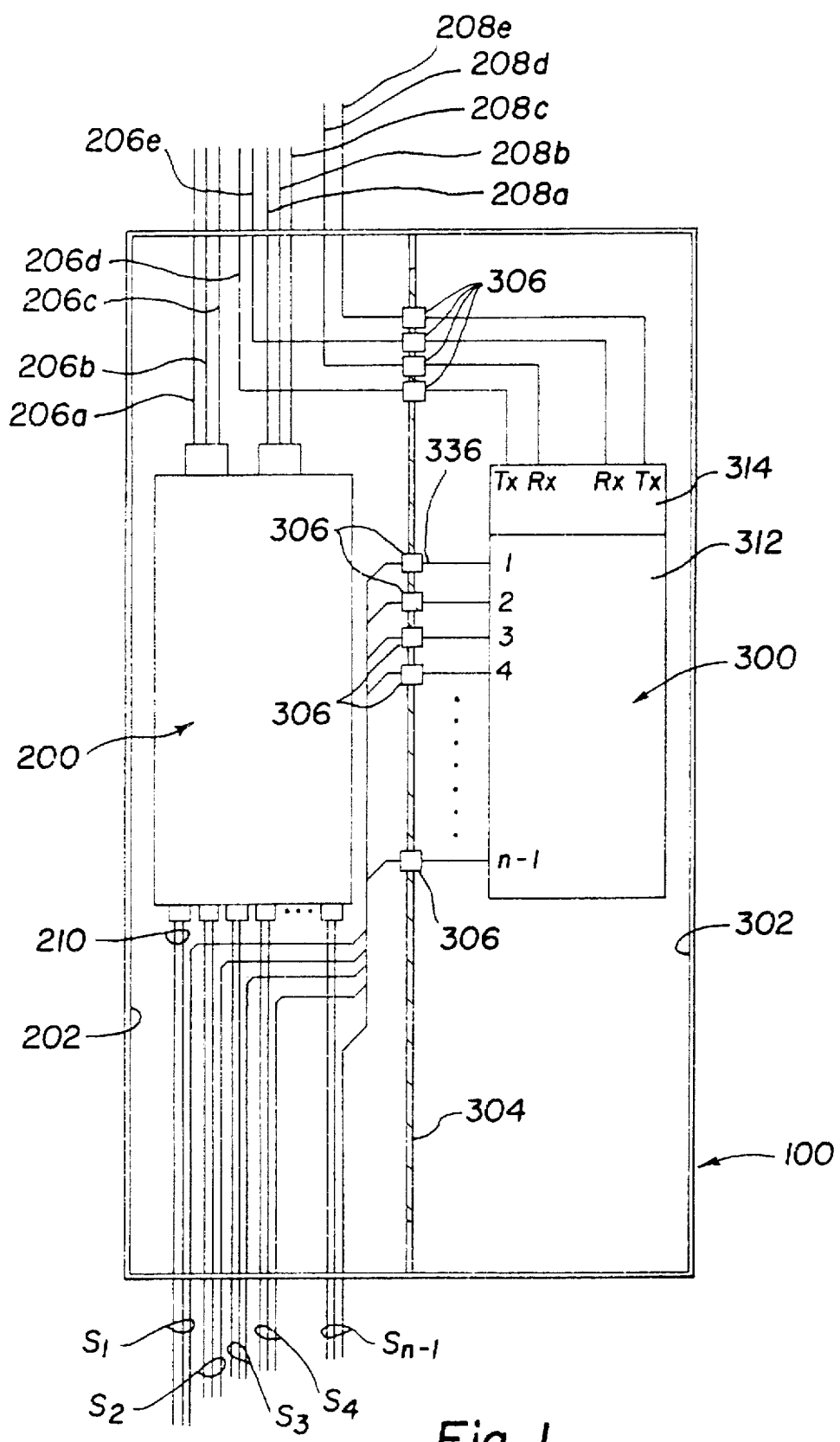
FIG. 1 is a schematic of a power/communications distribution of the present invention.

The present inventions will be described by referring to drawings showing and describing examples of how the inventions can be made and used. In these drawings the same reference characters are used throughout the several views to indicate like or corresponding parts.

Referring to FIG. 1, shown is an integrated communication and power distribution unit 100. Distribution unit 100 has a conventional ground-mounted electrical power transformer portion 200 and an optical communications portion 300.

Power transformer portion 200 has a high voltage enclosure 202. Contained within the high voltage enclosure 202 is a conventional power transformer 204 for converting high voltage power to household needs.

Electrically connected to power transformer 200 through high-voltage enclosure 202 are two integrated three-phase power/optic-fiber cables 206 and 208, respectively, such as those disclosed in U.S. Pat. No. 5,274,725, issued Dec. 28, 1993, to Jack Bottoms, Jr., et al., wherein the fiber-optic cables are embedded within the conductors of the primary voltage feed lines or ground lines. It should also be noted that separate fiber optic cable can be layered in the trench at the time of power cable installation, as is known in the industry.

Input cable 206 provides power input with power cables 206a, 206b, and 206c, accordingly, from a power line or other ground transformer. Also input into distribution unit 100 are transmit and receive optic-fiber cables 206d and 206e. Output cable 208 provides a link for connection to another distribution units or for closing the distribution path by terminating a head end used for home area networks. Output cable 208 has corresponding power cables 208a, 208b and 208c for the power phases and transmit and receive optic-fiber cables 208d and 208e. It should be noted that the transmit and receive cables can be combined into a unitary fiber-optic cable implementing bi-directional signaling techniques, as is well known in the industry.

Figure 3:
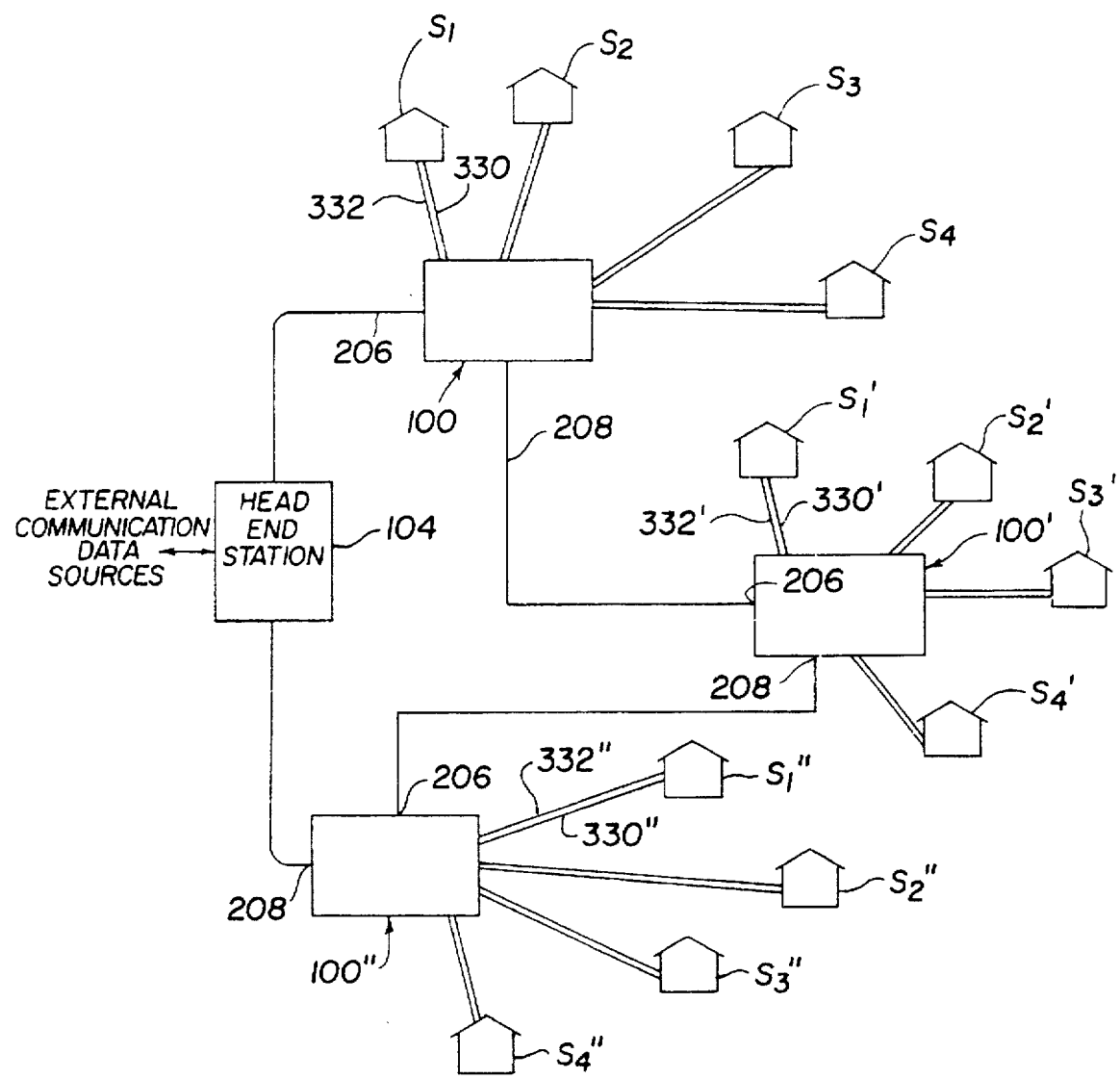
FIG. 3 is a power/communication network implemented with a plurality of photonic distribution units.

The optic-fiber cables 206d, 206e, 208d, and 208e can route integrated communications data signals. As an example, an integrated signal can contain data from an external communications data network that has a plurality of asynchronous and synchronous user data bandwidth segments or channels. These channels contain television programming data, direct space TV data (Ka Band, C-Band, and S-Band), audio programming data and telephony service data, including PSTN, from back-haul service providers or world wide communications networks. The telephony service data can be external to the resulting network or between network subscribers (FIG. 3). As the term is used herein, a "subscriber" is either a residential or business location that can subscribe to use the power and data provided by the integrated distribution unit 100. These communications signals are typically multiplexed together at a communications head-end for transmission over the optic-fibers. Optical frequencies provide wide signal bandwidths greater than or equal to 1 GHz. Such bandwidth capacity, for example, allows distribution of at least two-hundred television channels. The bandwidth simultaneously allows telephony and personal computer transmissions, compressed video conferencing and other data transmissions.

The high-voltage enclosure 202 and the low-voltage communications enclosure 302 are isolated from each other by bulk-head 304. Extending therethrough are a plurality of voltage isolation connectors 306. Through the isolation connectors 306, distribution input fiber-optic cables 206d and 206e are photonically connected to photonic distribution unit 300 at input photonic connector 308. Photonic pathways can be in free-space transmissions form or in wave-guide (fiberoptic) forms. A suitable isolation connector is an SC duplex adapter available from Amp, Inc. Similarly, distribution output fiber-optic cables 208d and 208e are photonically connected to photonic distribution unit 300 at output photonic connector 310.

Photonic distribution unit 300 has an optical switch assembly 312 and switch control circuit 314. Control circuit 314 demultiplexes controller commands sent from a community head-end station 104 for performing self-test functions, service hookup and discontinuance, as well as fault isolation. Similarly a holding voltage or digital command from the premises equipment may automatically initiate isolation upon premises equipment failure. Subscriber fiberoptic cables 336 extend from photonic distribution unit 300 through voltage isolation connectors 306 in bulkhead 304. The number of fiberoptic cables 336 number from 1 through n−1, where n is the number of subscriber nodes for providing power/communications services. Subscriber fiberoptic cables 336 are recombined with subscriber power cables 210, and extend from high-voltage enclosure 202. The integrated power/communications cables are installed, typically underground, to a subscriber node $S_1$, $S_2$, $S_3$, $S_4$ through $S_{n-1}$.

Figure 2:
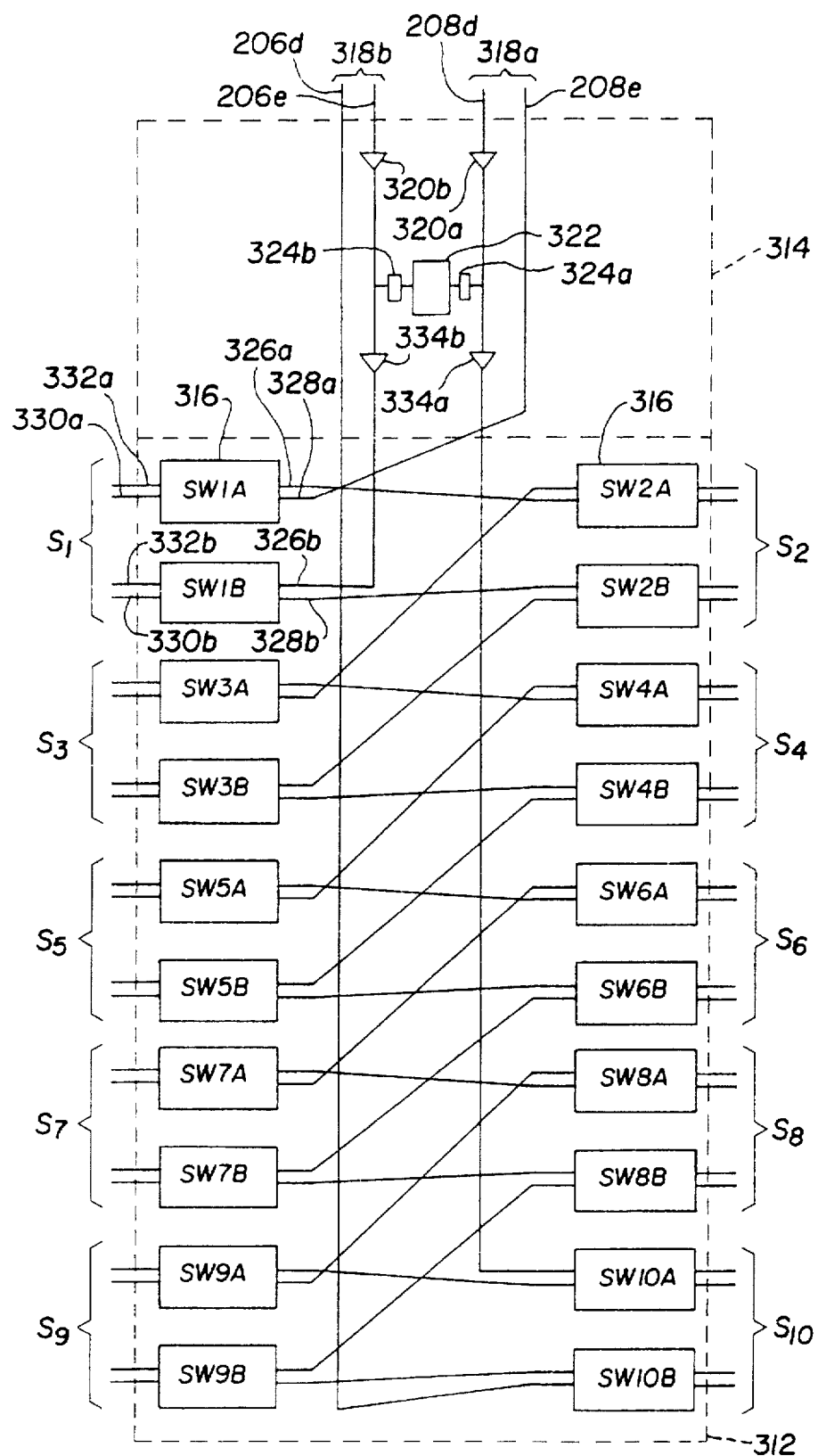
FIG. 2 is a schematic of a photonic distribution unit of the present invention.

Referring to FIG. 2, shown is a block schematic of control circuit 314 and switch assembly 312. Switch assembly has a plurality of two-by-two Multimode Fiberoptic Switches 316. Multimode fiberoptic switches are fully reversing optical bypass switches used to insert or bypass stations in fiber ring networks. In response to node, individual switch, failures, the switch reverts to the bypass state, thereby preserving network integrity. A suitable multimode fiberoptic switch is disclosed in U.S Pat. No. 4,834,488, issued May 30, 1989, to Ho-Shang Lee, the specification of which is incorporated by reference herein. A commercial embodiment of a multimode fiberoptic switch is available from DiCon Fiberoptics, Inc., of Berkeley, Calif. Switches 316 are electrically-driven solenoid-actuated optical switches. Each switch has an "IN" terminal 326, an "OUT" terminal 328, a "Rx" or receive terminal 330, and a "Tx" or transmit terminal 332. It should be noted that as technology evolves, semiconductor-actuated switches can be used in place of these solenoid-actuated optical switches.

Also, fiber optic switches 316 isolate failed subscriber equipment or set-top boxes because service is not provided to that premises. Isolation control can be accomplished through a holding voltage or command instruction from a community centralized head-end controller. For a series connected local area network ("LAN") type system, such isolation capability is important for maintaining system reliability. Alternative architectures could be used within the communications enclosure.

Plurality of switches 316 are arranged in a primary channel A and secondary channel B fiber optic loops 318a and 318b, respectively. Each group of two-by-two switches 316 (e.g., SW1A and SW1B) are electrically connected in parallel, which provides a network controller the capability to either selectively isolate or connect individual subscribers to the communications network. For example, optical switches SW1A and SW1B provide communications services to one subscriber. Thus, in the preferred embodiment, each subscriber has four fiberoptic cables going to it, providing an incoming data entrance 330a, an incoming data exit 332a, an outgoing data entrance 330b and an outgoing data exit 332b. The embodiment illustrated in FIG. 2 provides communications connections for at least ten subscribers $S_1$ through $S_{10}$. The fiberoptic cables are combined with household power lines 210 and subscriber fiberoptic cables, shown in FIG. 1, to limit installation expenses. It is believed that in the future only two primary optical fibers would be needed for the subscriber connections for two-directional communications, allowing termination of dark or un-powered fibers in the enclosure 100 for future subscriber uses.

Switch control circuit 314 is photonically connected to transmit and receive fiberoptic cables 208d and 208e, respectively, through channel A fiberoptic loop 318a. Switch control circuit preferably has a microcontroller, which is generally a one-chip integrated system typically having a peripheral features such as program and data memory, ports, and related sub-systems. A microprocessor can be used, but such devices are used to drive general-purpose computers. Switch control circuit 314 is also photonically connected to transmit and receive fiberoptic cables 206d and 206e, respectively, through channel B fiberoptic loop 318b. As shown in FIG. 2, circuit 318a allows parallel control for redundancy. These signal transmissions are converted from the optical propagation mode to the electrical propagation mode through optical receivers or detectors 320a and 320b, as is well known in the industry. Combined within the data signal are digital data segments or instructions segments that are assigned to the switch controller 322. The digital data segments are extracted with detection firmware modules 324a and 324b, respectively. The remaining signal data flow is reconverted to an optical propagation signal mode through optical transmitters or laser diodes 32 and the signal stream in input into the optical switch assembly.

Referring to FIG. 3, shown is a spoked-type network configuration with integrated communication/power distribution units 100, 100' and 100" distributing household power and communications data to subscribers $S_1$ through $S_4$, $S_1'$, through $S_4'$, and $S_1''$ through $S_4''$, respectively. More distribution units 100 can be similarly employed to provide network capabilities to a larger geographic area or larger subscription need. For clarity, the cables are set out by their base number. For example, cable 206 is understood to have cable components 206a, 206b, 206c, 206d, and 206e.

Referring to FIG. 3, shown is a serial interconnect for a electrical power transformer for a plurality of subscribers. As the term is used herein, a "subscriber" is either a residential or business location seeking to use the power and data provided by the integrated unit 100. In this case there is a A circuit and a B circuit 19. The optical circuits can be multi-mode or single-mode functionality.

At the subscriber residence, the subscriber has a distribution device with a combined fiber/power panel architecture and a conventional breaker power panel. An example of a distribution device is provided by the set-top box or station module disclosed in U.S. application Ser. No. 08/607,964, filed Feb. 29, 1996, entitled "Photonic Home Area Network," pending, incorporated by reference herein. The distribution device provides two-way communications connections for the home or business. Telephony connections would be category-3 or category-5 multi-pair cable looped through the subscriber's domain for individual-line data accumulation. Multi-output coaxial cable television channel connections are also provided from the distribution device.

Figure 4:
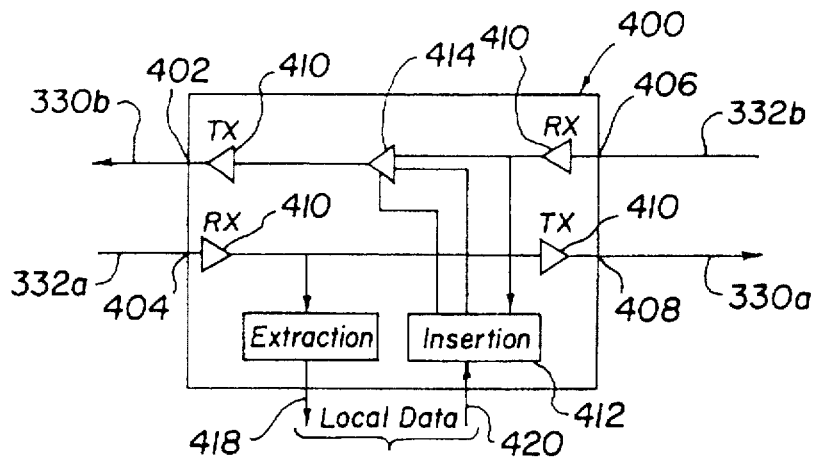
FIG. 4 is a schematic of a station module of the present invention.

In FIG. 4, shown is an illustration of a set-top box or station module 400, which has linear bidirectional link ("LBL") with demultiplexing and data extraction from a downstream channel and data insertion into an upstream channel. The LBL is formed through photonically connecting receive terminals 404 and 406 to photonic distribution unit 300 through transmit terminals 332a and 332b, respectively, and photonically connecting transmit terminals 402 and 408 to receive terminals 330b and 330a, respectively. LBL terminals 402 and 404 define an "upstream" or receive pathway data flow. LBL terminals 404 and 408 define a "downstream" or transmit pathway data flow. The photonic signals are converted into electrical representations or vice versa through optical detectors or receivers 410.

Data insertion can be accomplished through insertion module 412 with synchronous demultiplexing and re-multiplexing using high-speed demultiplexer and multiplexer integrated circuits capable of at least a 1.5 Giga-bits-per-second data rate time-division multiplexing ("TDM"). A suitable demultiplexer is a Fiber Channel Standard demultiplexer, such as a HDMP1014. A suitable multiplexer is also a Fiber Channel Standard multiplexer such as a HDMP1012, both available from Hewlett-Packard. The inserted data is then channeled through a gated-multiplexer 414 for insertion into the upstream data flow. Alternative SONET standard chip-sets can also be used, with minor data rate and configuration changes. Other forms of suitable data insertion are implemented by synchronous-labeled multiplexing wherein a station module detects an end-of-message ("EOM") code at the end of a data stream and appends the insertion data onto the end of the last message packet, or an asynchronous transmission burst within prescribed time slots having a synchronization preamble for each upstream burst. Data extraction is similarly accomplished through extraction module 416.

The extracted data is delivered to various units or ports such as a television, telephone or the like. Telephony or other such data is conveyed through insertion module 412 for integration into the upstream data flow through gated-multiplexer 414. The user data streams are 62.5 Megabits-per-second (Mbps) channel, but can be increased to two or three similar channels as the demands of the users increases. The user data bit stream is dynamically allocated by the head-end 104. As an example, about 2 Mbps to about 5 Mbps of the data frame can be allocated toward telephone conversations. Specific telephone conversations starting will be allocated to a position in the data frame at the start of the telephone call by the head-end 104 and that position in the data frame would remain allocated until that telephone call is terminated.

User data, conveyed through data lines 418 and 420, consists of telephony, personal computer data, auxiliary data for home maintenance and control, fire and intrusion alarm, etc. Futuristic home video conferencing equipment allowing total office immersion of stay-at-home workers could be supported. The bandwidth availability can readily accommodate data transmissions common today. For example, telephone service can be accomplished to about 500 subscribers with less than 3 Mbps. However, bandwidth hungry technologies such as real-time video conferencing, can require throughputs approaching a magnitude of Giga-bits-per-second. An initial allocation of 125 Mbps for the residences in the network is sufficient for future bandwidth needs in the near future. As is known in the industry, the communications interface electronics in the subscriber residence will vary depending upon system data format.

Figure 5:
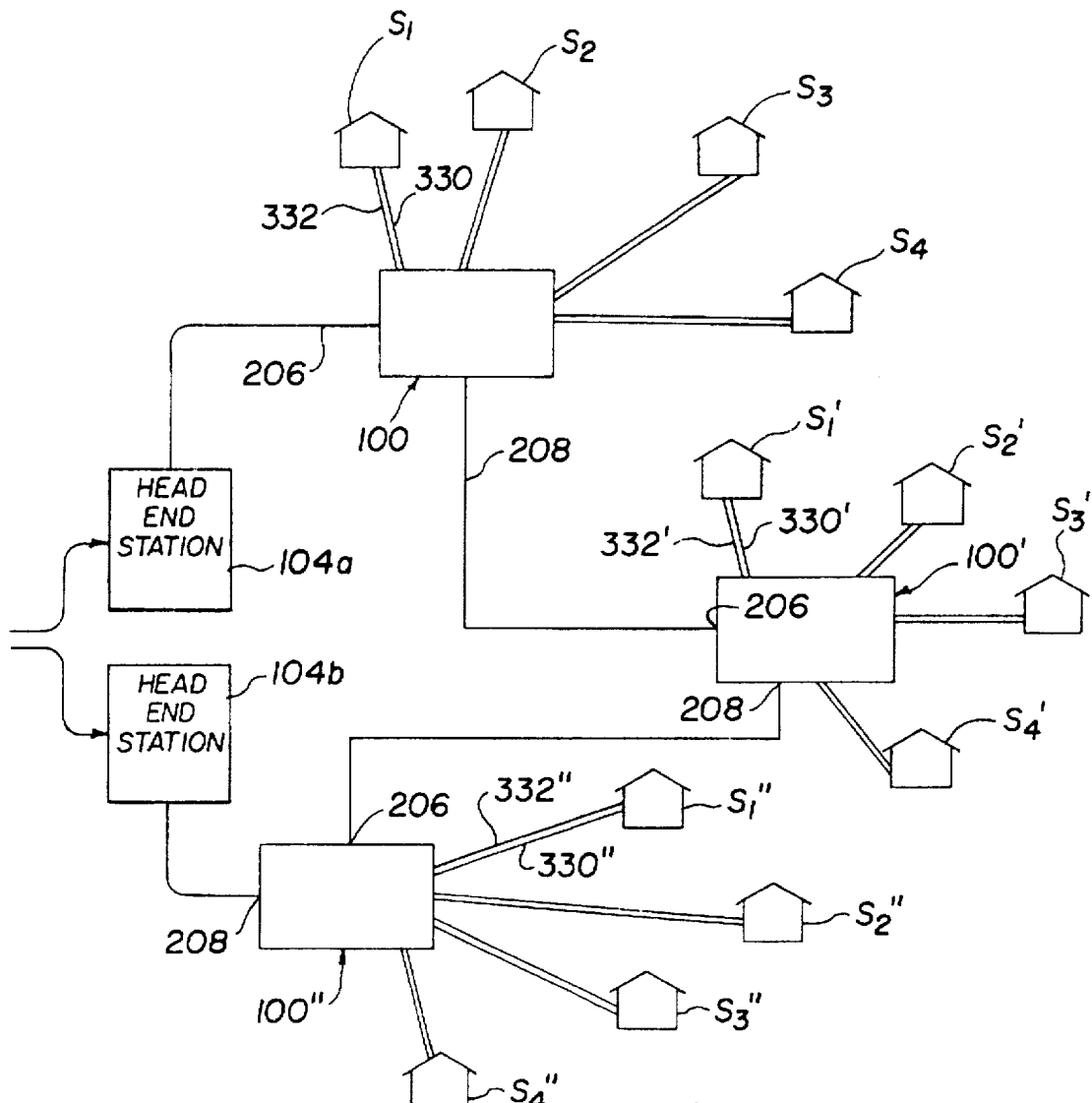
FIG. 5 is a power/communication network implemented with a first and a second head-end unit.

Referring to FIG. 5, shown is a linear topology that has one or more head-ends 104a and 104b. This particular topology uses the downstream path for distribution of the incoming head-end signals and the upstream path for accumulation of the outgoing head-end signals. Two head-ends topology accounts for signal-point failure auto-correction. Auto-correction is achieved by reversing the data flow in one side of each part of the broken segment of the network.

The description and figures of the specific examples above do not point out what an infringement of this invention would be, but are to provide at least one explanation of how to make and use the invention. Numerous modifications and variations of the preferred embodiments can be made without departing from the scope and spirit of the invention. Thus, the limits of the invention and the bounds of the patent protection are measured by and defined in the following claims.

Having described the invention, what is claimed is:

1. A photonic distribution apparatus for a home area network having a plurality of subscribers, the apparatus comprising:

an optical transmission medium having at least one transmit and one receive pathway, said optical transmission medium for conveying a communications data signal containing a plurality of distribution instruction segments;

a microcontroller circuit having a photonic interface converting optical transmission to an electrical signal transmission, and an extractor for culling said distribution instruction segments from said electrical signal transmission;

a communications routing circuit responsive to a distribution instruction from said microcontroller circuit, said routing circuit having a plurality of fiberoptic switches in fiberoptic communication with one another, wherein a first fiberoptic switch of said plurality of fiberoptic switches has an input terminal photonically connected to said one receive pathway, and a last fiberoptic switch of said plurality of fiberoptic switches has an output terminal photonically connected to said transmit pathway.

2. The photonic distribution apparatus of claim 1 further comprising:

a second optical transmission medium having at least one transmit and one receive pathway, said second optical transmission medium for redundantly conveying said communications data signal containing a plurality of distribution instruction segments; and a second communications routing circuit responsive to said distribution instruction from said microcontroller circuit, said second routing circuit having a second plurality of fiberoptic switches in fiberoptic communication with one another, wherein a first fiberoptic switch of said second plurality of fiberoptic switches has an input terminal photonically connected to said one receive pathway, and a last fiberoptic switch of said plurality of fiberoptic switches has an output terminal photonically connected to said transmit pathway.

3. The photonic distribution apparatus of claim 1 wherein said first and said second optical transmission mediums are fiberoptic cable.

4. The photonic distribution apparatus of claim 1 wherein said first and said second optical transmission mediums are embedded in an electrical cable having a plurality of electrical power conductors.

5. The photonic distribution apparatus of claim 4 further comprising:

a high-voltage enclosure;

a low-voltage enclosure, said microcontroller circuit and said communications routing circuit contained in said low-voltage enclosure; and a high-voltage transformer contained within said high-voltage enclosure, said transformer electrically connected to said plurality of electrical power conductors of said electrical cable and said first and second optical transmission mediums photonically.

6. The photonic distribution apparatus of claim 5 further comprising:

a second optical transmission medium having at least one transmit and one receive pathway, said second optical transmission medium for redundantly conveying said communications data signal containing a plurality of distribution instruction segments; and a second communications routing circuit responsive to said distribution instruction from said microcontroller circuit, said second routing circuit having a second plurality of fiberoptic switches in fiberoptic communication with one another, wherein a first fiberoptic switch of said second plurality of fiberoptic switches has an input terminal photonically connected to said one receive pathway, and a last fiberoptic switch of said plurality of fiberoptic switches has an output terminal photonically connected to said transmit pathway.

7. A subscriber area network for distributing data from an external communications data network, the subscriber area network comprising:

a head-end communications circuit for formatting a plurality of communications network segment data into a multiplexed data signal transmittable through a photonic multi-access channel having a downstream channel and an upstream channel, said head-end communications circuit having a bi-directional interface electrically connectable to the external communications data network and to said photonic multi-access channel;

at least one communications routing circuit in bilateral communication with said head-end communications circuit through said multi-access channel, each said routing circuit having a microcontroller circuit with a photonic interface for converting an optical transmission to a corresponding electrical signal transmission, and an extractor for culling a distribution instruction segment from said multiplexed data signal, said microcontroller circuit bi-directionally routing said multiplexed data signal through a plurality of subscriber terminals each having a downstream terminal and an upstream terminal; and at least one station module photonically connectable to said upstream terminal and said downstream terminal of a subscriber terminal of said plurality of subscriber terminals.

8. The subscriber area network of claim 7 wherein said at least one routing circuit has a plurality of fiberoptic switches in fiberoptic communication with one another, wherein a first fiberoptic switch of said plurality of fiberoptic switches has an input terminal photonically connected to said downstream channel, and a last fiberoptic switch of said plurality of fiberoptic switches has an output terminal photonically connected to said upstream channel.

* * * * *